United States Patent [19]

Ishimaru et al.

[11] Patent Number: 5,652,303
[45] Date of Patent: Jul. 29, 1997

[54] PROCESS FOR POLYMERIZING OLEFINS AND CATALYST FOR POLYMERIZING OLEFINS

[75] Inventors: Naoshi Ishimaru; Mamoru Kioka; Akinori Toyota, all of Waki-cho, Japan

[73] Assignee: Mitsui Petrochemical Industries, Ltd., Tokyo, Japan

[21] Appl. No.: 567,876

[22] Filed: Dec. 6, 1995

Related U.S. Application Data

[63] Continuation of Ser. No. 243,742, May 17, 1994, abandoned, which is a continuation of Ser. No. 76,173, Jun. 14, 1993, abandoned, which is a continuation of Ser. No. 946,031, Sep. 15, 1992, abandoned, which is a continuation of Ser. No. 487,446, Mar. 2, 1990, abandoned.

[30] Foreign Application Priority Data

Mar. 2, 1989 [JP] Japan ..................... 1-50868

[51] Int. Cl.$^6$ .................. C08F 4/654; C08F 4/651; C08F 10/00
[52] U.S. Cl. ................. 526/125.3; 502/125; 502/127; 526/351; 526/904
[58] Field of Search ............................. 526/125.3

[56] References Cited

U.S. PATENT DOCUMENTS

| | | | |
|---|---|---|---|
| 4,563,512 | 1/1986 | Goodall et al. | 526/351 |
| 4,716,206 | 12/1987 | Fujita et al. | 526/125 |
| 4,952,649 | 8/1990 | Kioka et al. | 526/125 |
| 4,981,930 | 1/1991 | Funabashi et al. | 526/351 |
| 4,985,515 | 1/1991 | Matsuura et al. | 526/125 |
| 5,100,981 | 3/1992 | Schreck et al. | 526/351 |

FOREIGN PATENT DOCUMENTS

| | | |
|---|---|---|
| 0267794 | 11/1987 | European Pat. Off. . |
| 0303704 | 2/1988 | European Pat. Off. . |
| 0350170 | 6/1989 | European Pat. Off. . |
| 349772 | 1/1990 | European Pat. Off. . |

*Primary Examiner*—Edward J. Smith
*Attorney, Agent, or Firm*—Sherman and Shalloway

[57] ABSTRACT

A catalyst for polymerization of an olefin, said catalyst being formed from

[A] a solid titanium catalyst component comprising magnesium, titanium, halogen and an electron donor as essential ingredients,

[B] an organoaluminum compound catalyst component, and

[C] an electron donor catalyst component comprising at least two electron donors including an electron donor (1) and an electron donor (2), the MFR (a) of homopolypropylene obtained by using the electron donor (1) together with the solid titanium catalyst component [A] and the organoaluminum compound catalyst component [B] has the following relation to the MFR (b) of homopolypropylene obtained by using the electron donor (2) under the same polymerization conditions as in the case of using the electron donor (1)

$\log [MFR(b)/MFR(a)] \geq 1.5$.

This catalyst can give an olefin polymer having a broad molecular weight. Also provided is a process for polymerizing or copolymerizing an olefin in the presence of the above catalyst.

13 Claims, 1 Drawing Sheet

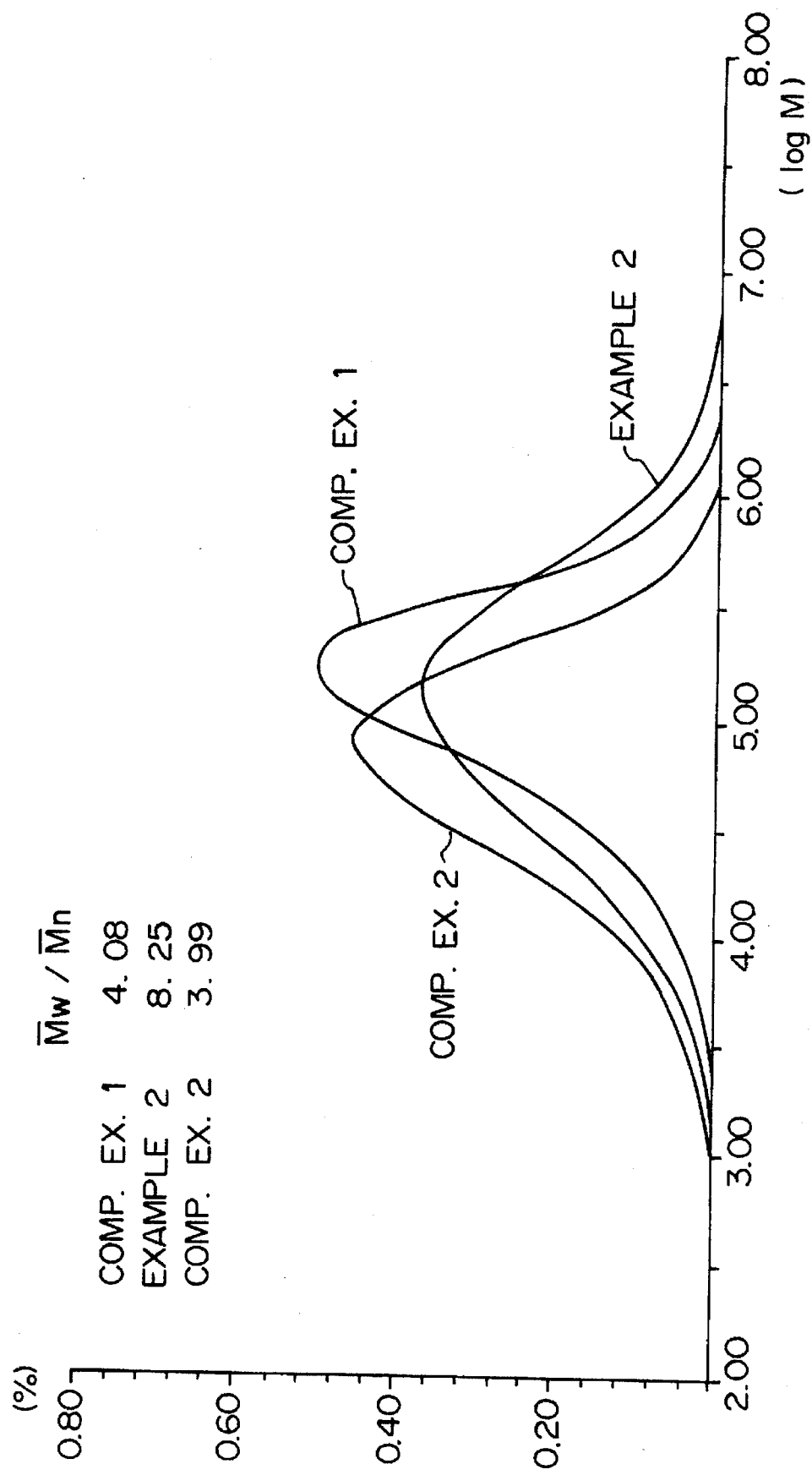

PROCESS FOR POLYMERIZING OLEFINS AND CATALYST FOR POLYMERIZING OLEFINS

This application is a continuation of application Ser. No. 08/243,742, filed May 17, 1994; which is a continuation of application Ser. No. 08/076,173, filed Jun. 14, 1993; which is a continuation of application Ser. No. 07/946,031, filed Sep. 15, 1992; which is a continuation of application Ser. No. 07/487,446, filed Mar. 2, 1990, all abandoned.

BACKGROUND OF THE INVENTION

1. Field of the Invention

This invention relates to a process for polymerizing an olefin to produce an olefin polymer having a broad molecular distribution in a high yield, and to a catalyst for polymerization of an olefin which is used in this process.

2. Description of the Prior Art

Many proposals have been made on the production of a solid catalyst component comprising magnesium, titanium, halogen and an electron donor as essential ingredients. It is known that by using such a catalyst component in the polymerization of an alpha-olefin having at least 3 carbon atoms, a highly stereoregular polymer can be produced in a high yield.

Generally, olefin polymers obtained by using an active catalyst component of the $MgCl_2$-supported type have a narrow molecular weight distribution and excellent mechanical properties. However, for some applications, olefin polymers which flow readily during melting and have improved moldability are desired.

In the prior art, attempts were made to improve moldability by preparing polymers of a broad molecular weight distribution by preparing olefins having different molecular weights in a plurality of polymerization reactors. This method cannot be used in a single polymerization reactor, and to produce an olefin polymer having a broad molecular weight distribution in a plurality of polymerization reactors is time-consuming. It has been desired therefore to develop a process for producing an olefin polymer having a broad molecular weight by a polymerization operation in a single stage.

The present inventors extensively made investigations in order to obtain an olefin polymer having a broad molecular weight distribution by a polymerization operation in a single stage, and have found that an olefin (co)polymer having a broad molecular weight distribution can be obtained by using at least two specific electron donors, and this finding has led to the present invention.

SUMMARY OF THE INVENTION

It is an object of this invention to solve the problem of the prior art, and to provide a process for polymerizing an olefin polymer having a broad molecular weight distribution by a polymerization operation in a single stage, and also to provide an olefin polymerization catalyst used in this process.

The above object of this invention is achieved in accordance with this invention by a process for polymerizing an olefin, which comprises polymerizing or copolymerizing an olefin in the presence of a catalyst, said catalyst being formed from

[A] a solid titanium catalyst component comprising magnesium, titanium, halogen and an electron donor as essential ingredients,

[B] an organoaluminum compound catalyst component, and

[C] an electron donor catalyst component comprising at least two electron donors including an electron donor (1) and an electrondonor (2), the MFR (a) of homopolypropylene obtained by using the electron donor (1) together with the solid titanium catalyst component [A] and the organoaluminum compound catalyst component [B] has the following relation to the MFR (b) of homopolypropylene obtained by using the electron donor (2) under the same polymerization conditions as in the case of using the electron donor (a)

$$\log [MFR\ (b)/MFR\ (a)] \geqq 1.5.$$

The above object is also achieved in accordance with this invention by an olefin polymerization catalyst, said catalyst being formed from

[A] a solid titanium catalyst component comprising magnesium, titanium, halogen and an electron donor as essential ingredients,

[B] an organoaluminum compound catalyst component, and

[C] an electron donor catalyst component comprising at least two electron donors including an electron donor (1) and an electron donor (2), the MFR (a) of homopolypropylene obtained by using the electron donor (1) together with the solid titanium catalyst component [A] and the organoaluminum compound catalyst component [B] has the following relation to the MFR (b) of homopolypropylene obtained by using the electron donor (2) under the same polymerization conditions as in the case of using the electron donor (a)

$$\log [MFR\ (b)/MFR\ (a)] \geqq 1.5.$$

DETAILED DESCRIPTION OF THE PREFERRED EMBODIMENTS

The process for polymerizing an olefin in accordance with this invention is characterized in that an olefin is polymerized or copolymerized in the presence of a catalyst formed from

[A] a solid titanium catalyst component comprising magnesium, titanium, halogen and an electron donor as essential ingredients,

[B] an organoaluminum compound catalyst component, and

[C] an electron donor catalyst component comprising at least two electron donors including an electron donor (1) and an electron donor (2), the MFR (a) of homopolypropylene obtained by using the electron donor (1) together with the solid titanium catalyst component [A] and the organoaluminum compound catalyst component [B] has the following relation to the MFR (b) of homopolypropylene obtained by using the electron donor (2) under the same polymerization conditions as in the case of using the electron donor (a)

$$\log [MFR\ (b)/MFR\ (a)] > 1.5.$$

The olefin polymerization catalyst of this invention is characterized by being formed from

[A] a solid titanium catalyst component comprising magnesium, titanium, halogen and an electron donor as essential ingredients,

[B] an organoaluminum compound catalyst component, and

[C] an electron donor catalyst component comprising at least two electron donors including an electron donor (1) and an electron donor (2), the MFR (a) of homopolypropylene obtained by using the electron donor (1) together with the solid titanium catalyst component [A] and the organoaluminum compound catalyst component [B] has the following relation to the MFR (b) of homopolypropylene obtained by using the electron donor (2) under the same polymerization conditions as in the case of using the electron donor (a)

log [MFR (b)/MFR (a)]>1.5.

Since the polymerization process of this invention uses a catalyst formed from the solid titanium catalyst component [A], the organoaluminum compound catalyst component [B] and at least two specific electron donor catalyst component [C], an olefin polymer having a broad molecular weight distribution and excellent stereo-regularity can be produced in a high yield. Furthermore, the above catalyst does not easily decrease in polymerization activity, and by using this catalyst, the melt flow rate of the olefin polymer can be easily adjusted.

The polymerization process and the olefin polymerization catalyst of this invention will be more specifically described below.

At times, the term "polymerization", as used herein, denotes copolymerization as well, and the term "polymer", used herein, denotes "copolymer" as well.

In the polymerization process of this invention, an olefin is polymerized or copolymerized in the presence of the olefin polymerization catalyst.

The olefin polymerization catalyst of this invention is formed from the solid titanium catalyst component [A], the organoaluminum compound=catalyst component [B] and the electron donor catalyst component [C] containing at least two specific electron donors.

The solid titanium catalyst component [A] is a highly active catalyst component containing magnesium, titanium, halogen and an electron donor as essential ingredients.

The solid titanium catalyst component [A] can be prepared by contacting a magnesium compound, a titanium compound and an electron donor.

Examples of the titanium compound used in the preparation of the solid titanium catalyst component [A] are tetravalent titanium compounds of the following formula

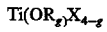

wherein R is a hydrocarbon group, X is a halogen atom, and g is from 0 to 4.

More specific examples include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$, and $Ti(O\ iso\text{-}C_4H_9)Br_3$; dialkoxytitanium dihalides such as $Ti(OCH_3)_2Cl_2$, $Ti(OC_2H_5)_2Cl_2$, $Ti(O\ n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxy titaniums such as $Ti(OCH_3)_4$, $Ti(OC_2H_5)_4$ and $Ti(O\ n\text{-}C_4H_9)_4$.

Of these, the halogen, containing titanium compounds, particularly titanium tetrahalides, are preferred. Especiallly preferred is titanium tetrachloride. The titanium compounds may be used singly or in combination with each other. The titanium compound may be diluted with a hydrocarbon compound or a halogenated hydrocarbon compound.

The magnesium compound to be used in the preparation of the solid titanium catalyst component [A] may include magnesium compound having reducibility and magnesium compound having no reducibility.

The magnesium compounds having reducibility may, for example, magnesium compounds having a magnesium-carbon bond or a magnesium-hydrogen bond. Specific examples of such reducible magnesium compounds include dimethyl magnesium, diethyl magnesium, dipropyl magnesium, dibutyl magnesium, diamyl magnesium, dihexyl magnesium, didecylmagnesium, magnesium ethyl chloride, magnesium propyl chloride, magnesium butyl chloride, magnesium hexyl chloride, magnesium amyl chloride, butyl ethoxy magnesium, ethyl butyl magnesium and butyl magnesium halides. These magnesium compounds may be used singly or they may form complexes with the organoaluminum compounds to be described. These magnesium compounds may be liquid or solid.

Specific examples of the magnesium compounds having no reducibility include magnesium halides such as magnesium chloride, magnesium bromide, magnesium iodide and magnesium fluoride; alkoxy magnesium halides such as magnesium methoxy chloride, magnesium ethoxy chloride, magnesium isopropoxy chloride, magnesium phenoxy chloride and magnesium methylphenoxy chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and magnesium carboxylates such as magnesium laurate and magnesium stearate.

These non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, etc.

In addition to the magnesium compounds having reducibility and magnesium compounds having no reducibility may be complexes of the above magnesium compounds with other metals, or mixtures thereof with other metal compounds. They may also be mixtures of two or more types of the above compounds.

In the present invention, magnesium compounds having no reducibility are preferred. Especially preferred are halogen-containing magnesium compounds. Among these, magnesium chloride, alkoxy magnesium chlorides and aryloxy magnesium chlorides are preferably used.

In preparing the solid titanium catalyst component [A] in this invention, it is preferable to use an electron donor. Examples of such electron donors are oxygen-containing electron donors such as alcohols, phenols, ketones, aldehydes, carboxylic acids, esters of organic or inorganic oxides, ethers, acid amides and acid anhydrides; nitrogen-containing electron donors such as ammonia, amines, nitriles, and isocyanates. More specific examples include alcohols having 1 to 18 carbon atoms such as methanol, ethanol, propanol, pentanol, hexanol, octanol, 2-ethylhexanol, dodecanol, octadecyl alcohol, benzyl alcohol, phenyl ethyl alcohol, cumyl alcohol and isopropylbenzyl alcohol; phenols having 6 to 25 carbon atoms which may have an alkyl group, such as phenol, cresol, xylenol, ethylphenol, propylphenol, cumylphenol, nonylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms including the esters desired to be included in the titanium catalyst component, such as methyl formate, ethyl formate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethylcyclohexanecarboxylate, diethyl 1,2-cyclohexanedicarboxylate, di(2-ethylhexyl) 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gamma-butyrolactone, delta-valerolactone, coumarin, phthalide and ethylene carbonate; inorganic acid esters such as ethyl silicate and butyl silicate; acid halides having 2 to 15 carbon atoms such as acetyl chloride, benzoyl chloride, toluyl chloride, anisoyl chloride and phthaloyl dichloride; ethers having 2 to 20 carbon atoms, such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride; amines such as methylamine, ethylamine, triethylamine, tributylamine, piperidine, tribenzylamine, aniline, pyridine, picoline and tetramethylethylenediamine; and nitriles such as acetonitrile, benzonitrile and trinitrile.

Organic silicon compounds of the following general formula (I)

$$R_nSi(OR')_{4-n} \quad (I)$$

wherein R and R' represent a hydrocarbon group, and 0<n<4,
may also be used as an electron donor Specific examples of the organic silicon compounds of formula (I) are trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltriethoxysilane, phenyltrimethoxysilane, gamma-chloropropyltrimethoxysilane, methyltolueneethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethyl phenoxysilane, methyltriallyloxysilane, vinyltris-(beta-methoxyethoxysilane), vinyltriacetoxysilane, dimethyltetraethoxydisiloxane, di-cyclohexylmethyldimethoxysilane, cyclopentylmethyldimethoxysilane, dicyclopentyldimethoxysilane, dicyclopentyldiethoxysilane, di-n-propyldiethoxysilane, di-t-butyldiethoxysilane, and cyclopentyltriethoxysilane.

Preferred among them are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

At least two of these electron donors may be used.

Electron donors that are desirably included into the titanium catalyst component are esters. Preferred are those having skeletons of the general formulae

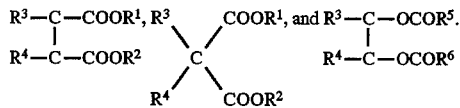

wherein $R^1$ represents a substituted or unsubstituted hydrocarbon group; each of $R^2$, $R^5$ or $R^6$ represents a hydrogen atom or a substituted or unsubstituted hydrocarbon group; $R^3$ and $R^4$ represent a hydrogen atom or a substituted or unsubstituted hydrocarbon atom, preferably one of them is a substituted or unsubstituted hydrocarbon group; and $R^3$ and $R^4$ may be linked to each other. The substituted hydrocarbons for $R^1$ to $R^5$ may contain hetero atoms such as N, O or S, such as C—O—C, COOR, COOH, OH, $SO_3H$, —C—N—C— or $NH_2$.

Especially preferred are diesters of dicarboxylic acids having an alkyl group with at least 2 carbon atoms.

Specific examples of polycarboxylic acid esters include aliphatic polycarboxylic acid esters such as diethyl succinate, dibutyl succinate, diethyl methylsuccinate, diisobutyl alpha-methylglutarate, dibutylmethyl malonate, diethyl malonate, diethyl ethyl malonate, diethyl isopropylmalonate, diethyl butyl-malonate, diethyl phenylmalonate, diethyl diethyl-malonate, diethyl allylmalonate, diethyl diisobutyl-malonate, diethyl di-n-butyl-malonate, dimethyl maleate, mono-octyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate, and diethyl bicyclo[2.2.1]heptene-2,3-dicarboxylate; aromatic polycarboxylic acid esters such as monoethyl phthalate, dimethyl phthalate, methylethyl phthalate, monoisobutyl phthalate, mono-n-butyl phthalate, diethyl phthalate, ethylisobutyl phthalate, ethyl-n-butyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and esters of heterocyclic polycarboxylic acid esters such as 3,4-furanedicarboxylic acid.

Specific examples of polyhydroxyl esters are 1,2-diacetoxybenzene, 1-methyl-2,3-diacetoxybenzene, 2,3-diacetoxynaphthalene, ethyleneglycol dipivalate and butanediol pivalate.

Specific examples of hydroxy-substituted carboxylic acids include benzoyl salicylate, acetyl isobutyl salicylate and acetyl methyl salicylate.

Besides the above esters, long-chain dicarboxylic acid esters such as diethyl adipate, diisobutyl adipate, diisopropyl sebacate, di-n-octyl sebacate and di-2-ethylhexyl sebacate may be used as the polycarboxylic acid esters that can be supported in the titanium catalyst component.

Preferred as the polyfunctional esters are the compounds having skeletons of the general formulae. More preferred are esters of phthalic acid, maleic acid and substituted malonic acid with alcohols having at least 2 carbon atoms. Especially preferred are diesters of phthalic acid with alcohols having at least 2 carbon atoms.

Other electron donors that can be supported on the titanium catalyst component are monocarboxylic acid esters of the formula

RCOOR' wherein R and R' represent a hydrocarbyl group, at least one of them is a branched chain (including alicyclic) or a ring-containing chain groups.

Specific examles of R and R' may be $(CH_3)_2CH-$, $C_2H_5CH(CH_3)-$, $(CH_3)_2CHCH_2-$, $(CH_3)_3C-$, $C_2H_5CH(CH_3)CH_2-$,

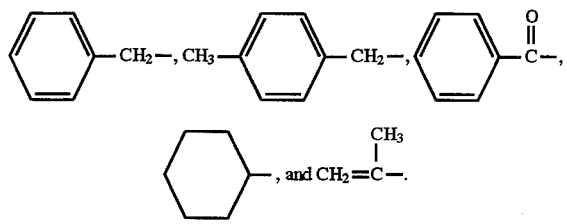

If one of R and R' is the above groups, the other may be the above group, or another group such as a straight-chain or ring-like group.

Specific examples include monoesters of di-methylacetic acid, trimethylacetic acid, alpha-methyl butyric acid, beta-methyl butyric acid, methacrylic acid and benzoylacetic acid, and monocarboxylates of alcohols such as isopropanol, isobutyl alcohol and tert-butyl alcohol.

Carbonate esters may also be selected as electron donors. Specific examples include diethyl carbonate, ethylene carbonate, diisopropyl carbonate, phenylethyl carbonate and diphenylcarbonate.

It is not always necessary to use these compounds as starting materials in supporting these electron donors, and compounds which can be changed to these compounds in the course of preparing the titanium catalyst component may be used.

Other electron donors may be present in the titanium catalyst component. However, if it is present in too large an amount, it will exert an adverse effect. Hence, the amount of another electron donor should be limited to a small amount.

In the present invention, the solid titanium catalyst component [A] may be magnesium contacting the magnesium compound (or metallic magnesium), the electron donor and the titanium compound. For this purpose, any known method of producing a highly active titanium catalyst component from a magnesium compound, a titanium compound and electron donor may be used. The above ingredients may be contacted in the presence of other reaction reagents such as silicon, phosphorus or aluminum.

Several examples of the method of producing the solid titanium catalyst component [A] will be briefly described.

(1) A magnesium compound, or a complex of the magnesium compound with an electron donor is reacted with a titanium compound in the liquid phase. The reaction may be carried out in the presence of a pulverization aid. In performing the above reaction, a solid compound may be pulverized.

(2) A liquid magnesium compound having no reducibility is reacted with a liquid titanium compound in the presence of an electron donor to precipitate a solid titanium complex.

(3) A titanium compound is further reacted with the reaction product obtained in (2).

(4) An electron donor and a titanium compound are further reacted with the reaction product obtained in (1) or (2).

(5) A magnesium compound, or a complex of the magnesium compound and an electron donor is pulverized in the presence of a titanium compound. The solid product obtained is treated with halogen, a halogen-containing compound or an aromatic hydrocarbon. In this method, the magnesium compound or the complex of the magnesium compound and the electron donor may be pulverized in the presence of a pulverization aid. Or a magnesium compound or the complex of the magnesium compound and the electron donor is pulverized in the presence of a titanium compound, and the product may be pre-treated with a reaction aid, and then treated with halogen, etc. An example of the reaction aid may be an organoaluminum compound and halogen-containing silicon compound.

(6) The compound obtained in each of (1) to (4) is treated with halogen or a halogen compound or an aromatic hydrocarbon.

(7) A reaction product obtained by contacting a metal oxide, a dihydrocarbyl magnesium and a halogen-containing alcohol is contacted with an electron donor and a titanium compound.

(8) A magnesium compound such as a magnesium salt of an organic acid, an alkoxy magnesium compound or an aryloxy magnesium is reacted with an electron donor, a titanium compound and/or a halogen-containing hydrocarbon.

Of the methods of preparing the solid titanium catalyst [A] cited in (1) to (8), the method using a liquid titanium halide at the time of preparing the catalyst and the method in which after or while a titanium compound is used, a halogenated hydrocarbon is used are preferred.

The amounts of the individual ingredients used in preparing the solid titanium catalyst component [A] differ depending upon the method of preparation and cannot be generally determined. For example, per mole of the magnesium compound, the electron donor and the titanium compound are used in an amount of 0.01 to 5 moles, preferably 0.05 to 2 moles, and in an amount of about 0.01 to 500 moles, preferably 0.05 to 300 moles, respectively.

The solid titanium catalyst component [A] so prepared contains magnesium, titanium, halogen and an electron donor as essential ingredients.

In the solid titanium catalyst component [A], the halogen/titanium atomic ratio is about 4 to 200, preferably about 5 to 100. The electron donor/titanium mole ratio is about 0.1 to 10, preferably about 0.2 to about 6. The magnesium/titanium atomic ratio is about 1 to 100, preferably about 2 to about 50.

In comparison with commercial magnesium halide, the solid titanium component [A] contains magnesium halide having a smaller crystal size, and its specific surface area is usually at least about 50 m²/g, preferably about 60 to 1,000 m²/g, more preferably about to 800 m²/g. Since the above ingredients constitute an integral body to form the solid titanium component [A], its composition does not change even when it is washed with hexane.

The solid titanium catalyst component [A] may be used singly, or after it is diluted with an inorganic or organic compound, for example, a silicon compound, an aluminum compound or a polyolefin. When a diluent is used, this component [A] shows high activity even if its specific surface area is lower than that specified above.

The methods of preparing such a highly active titanium catalyst component are disclosed, for example, in Japanese Laid-Open Patent Publications Nos. 108385/1975, 126590/1975, 20297/1976, 28189/1976, 64586/1976, 92885/1976, 136625/1976, 37489/1977, 1000596/1977, 147688/1977, 104593/1977, 2580/1978, 40093/1978, 40094/1978, 43094/1978, 135102/1980, 135103/1980, 152710/1988, 811/1981, 11908/1981, 18606/1981, 83006/1983, 138705/1983, 138706/1983, 138707/1983, 138708/1983, 138709/1983, 138710/1983, 138715/1983, 23404/1985, 21109/1986, 37802/1986, and 37808/19786.

Compounds containing one aluminum-carbon bond at least in the molecule may be utilized as the organoaluminum compound catalyst component [B].

Examples include the following.

(i) Organoaluminum compounds of the general formula $$R^1_m Al(OR^2)_n H_p X_q$$

wherein $R^1$ and $R^2$ are identical or different, and each represents a hydrocarbon group usually containing 1 to 15 carbon atoms, preferably 1 to 4 carbon atoms; X represents a halogen atom; and $0<m\leq 3$, $0\leq n<3$; $0\leq p<3$, and $0\leq q<3$, and $m+n+p+q=3$.

(ii) Complex alkylated compounds of metals of Group I and aluminum represented by the general formula $$M^1 Al R^1_4$$

wherein $M^1$ is Li, Na or K and $R^1$ is as defined above.

The following compounds may be cited as examples of the organoaluminum compounds of formula (i).

Compounds represented by the following general formulae.

$$R^1_m Al(OR^2)_{3-m}$$

wherein $R^1$ and $R^2$ are as defined above, and m is preferably $1.5 \leq m \leq 3$.

$$R^1_m AlX_{3-m}$$

wherein $R^1$ is as defined above, X is halogen, and m is preferably $0<m<3$.

$$R^1_m AlH_{3-m}$$

wherein $R^1$ is as defined above, m is preferably $2 \leq m \leq 3$.

$$R^1_m(OR^2)_n X_q$$

wherein $R^1$ and $R^2$ are as defined above, X is halogen, $0<m\leq 3$, $0\leq n<3$, $0\leq q<3$, and $m+n+q=3$.

Specific examples of the aluminum compounds represented by (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesquibutoxide; partially alkoxylated alkyl aluminums having an average composition represented by the general formula $(R^1)_{2.5}Al(OR^2)_{0.5}$; partially halogenated alkyl aluminums, for example alkyl aluminum dihalides such as ethyl aluminum dichloride, propyl aluminum dichloride and butyl aluminum dibromide; partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds in which two or more aluminum atoms are bonded through an oxygen or nitrogen atom may be cited as compounds resembling (i). Examples are $(C_2H_5)_2AlOAl(C_2H_5)_2$, $(C_4H_9)_2AlOAl(C_4H_9)_2$, $$(C_2H_5)_2AlNAl(C_2H_5)_2$$
$$|$$
$$C_2H_5$$

and methylaluminoxane.

Examples of the compound of the formula (ii) are LiAl$(C_2H_5)_4$ and LiAl$(C_7H_{15})_4$.

Among them, the trialkyl aluminums and alkylaluminums resulting from bonding of at least two aluminum compounds are preferred.

As the electron donor component [C], at least two electron donors including the electron donor (1) and the electron donor (2) are used.

The electron donors (1) and (2) should be selected such that the MFR (a) of homopolypropylene obtained by homopolymerizing propylene by using the electron donor (1) in combination with the solid titanium catalyst component [A] and the organoaluminum compound catalyst component [B] and the MFR (b) of homopolypropylene obtained by homopolymerizing propylene by using the electron donor (2) under the same conditions as in the case of using the electron donor (1) have the following relation.

$$\log [MFR (b)/MFR (a)] > 1.5.$$

The electron donors to be used in the preparation of the electron donor catalyst component [C] may be those electron donors which are used in preparing the solid titanium catalyst component [A]. It is particularly preferred to select each of the electron donors (1) and (2) from organic silicon compounds.

Organic silicon compounds of formula [I]

$$R_n Si(OR')_{4-n} \qquad [I]$$

wherein R and R' represent a hydrocarbon group and $0<n<4$.

Specific examples of the organic silicon compounds of general formula [I] include trimethylmethoxysilane, trimethylethoxysilane, dimethyldimethoxysilane, dimethyldiethoxysilane, diisopropyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclohexyltrimethoxysilane, cyclohexyltriethoxysilane, 2-norbornanetriethoxysilane, 2-norbornanemethyldimethoxysilane, ethyl silicate, butyl silicate, trimethylphenoxysilane, methylallyloxysilane, vinyltris(betamethoxyethoxysilane), vinyltriacetoxysilane and dimethyltetraethoxydisiloxane.

Of these, organic silicon compounds of formula [II] are preferably used.

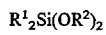
$R^1_2Si(OR^2)_2$      [II]

In the formula, $R^1$ represents a hydrocarbon group in which the carbon adjacent to Si is secondary or tertiary. Specific examples include alkyl groups such as isopropyl, sec-butyl, t-butyl and t-amyl groups, cycloalkyl groups such as cyclopentyl and cyclohexyl groups, cycloalkenyl groups such as a cyclopentenyl group, and aryl groups such as phenyl and tolyl groups. The alkyl and cycloalkyl groups are preferred.

In formula [II], $R^2$ represents a hydrocarbon group, preferably a hydrocarbon group having 1 to 5 carbon atoms, especially preferably 1 to 2 carbon atoms.

Specific examples of the organic silicon compound of formula [II] are diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxysilane, diphenyldimethoxysilane, bis-o-tolyldimethoxysilane, bis-m-tolyldimethoxysilane, bis-p-tolyldimethoxysilane, and bis-ethylphenyldimethoxysilane.

Preferred among the organic silicon compound of formula [II] are those represented by the following general formula [III]

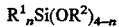
$R^1_nSi(OR^2)_{4-n}$      [III]

wherein when n is 2, $R^1$ each represents a hydrocarbon group, and at least one of the two hydrocarbon groups is a hydrocarbon group in which the carbon adjacent to Si is primary. Specific examples of the hydrocarbon group are alkyl groups such as ethyl, n-propyl and n-butyl groups, aralkyl groups such as cumyl and benzyl groups, and alkenyl groups such as a vinyl group.

In formula [III], $R^2$ represents a hydrocarbon group preferably having 1 to 5 carbon atoms, especially preferably 1 to 2 carbon atoms. Specific examples of the organic silicon compounds of-formula [III] in which n is 2 are diethyldimethoxysilane, dipropyldimethoxysilane, di-n-butyldimethoxysilane, dibenzyldimethoxysilane and divinyldimethoxysilane.

When $0 \leq n < 2$ or $2 < n < 4$ in formula [III], $R^1$ is a hydrocarbon group, specifically an alkyl, cycloalkyl, alkenyl, aryl or aralkyl group. $R^2$ represents a hydrocarbon group, preferably having 1 to 5 carbon atoms, especially preferably 1 to 2 carbon atoms.

Specific examples of the organic silicon compounds of formula [III] in which $0 \leq n < 2$ or $2 < n < 4$ include trimethylmethoxysilane, trimethylethoxysilane, methylphenyldimethoxysilane, methyltrimethoxysilane, t-butylmethyldimethoxysilane, t-butylmethyldiethoxysilane, t-amylmethyldimethoxysilane, phenylmethyldimethoxysilane, cyclohexylmethyldimethoxysilane, cyclohexylmethyldiethoxysilane, ethyltrimethoxysilane, ethyltriethoxysilane, vinyltriethoxysilane, methyltrimethoxysilane, methyltriethoxysilane, propyltrimethoxysilane, decyltrimethoxysilane, decyltriethoxysilane, phenyltrimethoxysilane, propyltriethoxysilane, butyltriethoxysilane, phenyltriethoxysilane, vinyltrimethoxysilane, vinyltributoxysilane, cyclohexyltrimethoxysilane, 2-norbornanetrimethoxysilane and 2-norbornanetriethoxysilane.

Preferred among them are methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane and cyclohexyltrimethoxysilane.

The above organic silicon compound may be used such that a compound capable of being changed to such an organic silicon compound is added at the time of polymerizing or preliminarily polymerizing an olefin, and the organic silicon compound is formed in situ during the polymerization or the preliminary polymerization of the olefin.

In the polymerization process of this invention, an olefin is polymerized in the presence of the above-described catalyst. Preferably, before the polymerization (main polymerization), a preliminary polymerization is preferably carried out.

By performing such a preliminary polymerization, a powdery polymer having a high bulk density can be obtained, and the stereoregularity of the resulting polymer tends to increase. If preliminary polymerization is carried out by the slurry polymerization, the resulting slurry has excellent properties. Accordingly, by the polymerization process of this invention, handling of the resulting powdery polymer or the slurry polymer becomes easy. In the preliminary polymerization the solid titanium catalyst component [A] is used in combination with at least a portion of the organoaluminum compound catalyst component [B] at this time, it is possible to cause part or the whole of the electron donor catalyst component [C] to be copresent.

In the preliminary polymerization, the catalyst may be used in much higher concentrations than in the main polymerization system.

The concentration of the catalyst of the solid titanium catalyst component [A] in the preliminary polymerization is usually about 0.01 to 200 millimoles, preferably about 0.05 to 100 millimoles, calculated as titanium atom, per liter of the inert hydrocarbon medium to be described.

The amount of the organoaluminum catalyst component [A] may be such that will produce 0.1 to 500 g, preferably 0.3 to 300 g, of a polymer per gram of the solid titanium catalyst component, and is desirably about 0.1 to 100 moles, usually, and preferably about 0.5 to 50 moles, per mole of the titanium atom in the solid titanium catalyst component [A].

Preferably, the preliminary polymerization is carried out under mild conditions in an inert hydrocarbon medium in which an olefin and the catalyst components are present. Examples of the inert hydrocarbon medium used at this time include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these. Among the inert hydrocarbon media, aliphatic hydrocarbons are especially preferably used.

The olefin used in the preliminary polymerization may be the same as an olefin to be used in the main polymerization.

When such an olefin is used in the preliminary polymerization, a highly crystalline polymer may be obtained from an olefin having 2 to 10 carbon atoms, preferably 3 to 10 carbon atoms.

In the process of this invention, a liquid alpha-olefin may be used instead of part or the whole of the inert hydrocarbon medium used during the preliminary polymerization.

The reaction temperature for the preliminary polymerization may be a point at which the resulting preliminary polymerization does not dissolve substantially in the inert hydrocarbon medium. Desirably, it is usually about −20° to +100° C., preferably about −20° to +80° C., more preferably 0° to +40° C.

In the preliminary polymerization, a molecular weight controlling agent such as hydrogen may be used. The molecular weight controlling agent may desirably be used in such an amount that the polymer obtained by preliminary polymerization has an intrinsic viscosity, measured in decalin at 135° C., of at least about 0.2 dl/g, preferably 0.5 to 10 dl/g.

Desirably, the preliminary polymerization is carried out so that about 0.1 to 1000 g, preferably about 0.3 to 300 g, per gram of the titanium catalyst component [A], of a polymer forms. If the amount of the olefin polymerized in the preliminary polymerization is too large, the efficiency of production of an olefin polymer in the main polymerization may sometimes be lowered.

The preliminary polymerization may be carried out batchwise or continuously.

After the preliminary polymerization is carried out as above, or without any prepolymerization, the main polymerization of an olefin is carried out in the presence of an olefin polymerization catalyst formed from the solid titanium catalyst component [A], the organoaluminum catalyst component [B], and the electron donor catalyst component [C].

Examples of the olefin that can be used in the main polymerization are ethylene, propylene, 1-butene, 4-methyl-1-pentene and 1-octene. These olefins may be be used singly or in combination. Particularly it is preferable to homopolymerize propylene or 1-butene, or to copolymerize an olefin mixture containing propylene or 1-butene as a main component. In using the olefin mixture, the proportion of propylene or 1-butene as a main component is usually at least 50 mole %, preferably at least 70 mole %.

In particular, by polymerizing an alpha-olefin having at least 3 carbon atoms, a polymer having a high regularity index can be produced at a high catalytic efficiency.

When these olefins are homopolymerized or copolymerized, a polyunsaturated compound such as a conjugated diene or a non-conjugated diene may also be used as a polymerization material.

In the present invention, the main polymerization of the olefin is carried out usually in the gaseous phase or the liquid phase.

When the main polymerization is carried out by slurry polymerization, the above inert hydrocarbon may be used as a reaction solvent, or an olefin liquid at the reaction may be used as the solvent.

In the polymerization process of this invention, the titanium catalyst component [A] is used usually in about 0.005 to 0.5 millimole, preferably about 0.01 to 0.5 millimole, calculated as Ti atom, per liter of the reaction zone. The organoaluminum compound catalyst component is used in such an amount that the amount of the metal atom in the organoaluminum compound catalyst component [B] is usually about 1 to 2,000 moles, preferably about 5 to 500 moles, per mole of the titanium atom in the solid titanium catalyst component [A] in the polymerization system. The total amount of the electron donor catalyst component [C] is usually about 0.001 to 10 moles, preferably about 0.01 to 2 moles, especially preferably about 0.05 to 1 mole, calculated as Si atoms in the electron donor catalyst component [C] per mole of the metal atom in the catalyst component [B].

In the polymerization process of the invention, the titanium catalyst component [A], the organoaluminum compound catalyst component [B] and the electron donor catalyst component [C] may be contacted with each other at the time of the main polymerization, or before the main polymerization, for example at the time of the preliminary polymerization. In contacting them before the main polymerization, any two of these components may be freely selected and contacted. Alternatively, two or three of the components, individually taken partly, may be contacted with each other.

The electron donors (1) and (2) may both be used at the time of the preliminary polymerization. Alternatively, one of them is used at the time of the preliminary polymerization, and the other, at the time of the main polymerization. It is further possible to use the two electron donor for the first time in the main polymerization.

In the polymerization process of this invention, the catalyst components may be contacted with each other before the polymerization in an inert gaseous atmosphere. Alternatively, the individual catalyst components may be contacted with each other in an olefin atmosphere.

When the organoaluminum compound catalyst component [B] and the electron donor catalyst component [C] are used partly in the preliminary polymerization, the catalyst components used in the preliminary polymerization are used together with the remainder of the catalyst components. In this case, the catalyst components used in the preliminary polymerization may contain preliminary polymerization products. If hydrogen is used at the time of the main polymerization, the molecular weight of the resulting polymer may be adjusted, and a polymer having a high melt flow rate can be obtained. According to the polymerization process of this invention, the stereo-regularity index of the resulting polymer and the activity of the catalyst are not reduced.

In the present invention, the polymerization temperature of the olefin is usually set at about 20° to 200° C., preferably about 50° to 180° C., and the polymerization pressure, usually atmospheric pressure to 100 kg/cm², preferably at about 2 to 50 kg/cm². The 10. polymerization process can be carried out batchwise, semicontinuously or continuously. The polymerization may be carried out in two or more stages under different reaction conditions.

The polymer of the olefin obtained may be a homopolymer, a random copolymer or a blocked copolymer.

Since in the present invention, the yield of a polymer having stereoregularity per unit weight of the solid catalyst component is high, the catalyst residue, particularly the halogen content, in the polymer can be decreased relatively, and an operation of removing the catalyst from the polymer can be omitted, and furthermore, in molding the resulting polymer, the rusting of a mold can be effectively prevented.

The olefin polymer obtained by using the catalyst in accordance with this invention has a broad molecular weight distribution, and therefore, has excellent melt-moldability.

According to the polymerization process of the invention, olefins are polymerized by using a specific polymerization catalyst formed from the solid titanium catalyst component [A], the organoaluminum compound, catalyst component [B] and the electron donor catalyst component[C]. Hence, an olefin polymer having a particularly broad molecular weight distribution can be produced in high yields.

The olefin polymerization method of this invention does not merely bring about a wide molecular weight distribution, but gives the unexpected result that a high-molecular-weight component not obtainable in a conventional polymerization in a single stage is formed (shown in FIG. 1). An increase in strength of the olefin polymer owing to this high-molecular-weight component can be expected.

The olefin polymer obtained by the polymerization process of this invention has high stereo-regularity and a high bulk density.

In addition, the catalyst of this invention can give olefin polymers having the above excellent properties with a good efficiency, and little decreases in catalytic activity with the lapse of the polymerization time.

The following examples will illustrate the present invention more specifically. It should be understood however that invention is not limited to these specific examples.

EXAMPLE 1

Preparation of a solid titanium catalyst component [A]

Anhydrous magnesium chloride (7.14 g; 75 millimoles), 37.5 ml of decane and 35.1 ml (225 millimoles) of 2-ethylhexyl alcohol were reacted at 130° C. for 2 hours to form a uniform solution. Then, 1.67 g (11.8 millimoles) of phthalic anhydride was added and dissolved in the uniform solution.

The uniform solution so obtained was cooled to room temperature and all added dropwise over 1 hour to 200 ml (1.8 moles) of titanium tetrachloride kept at −20° C. After the addition, the temperature of the resulting solution was elevated to 110° C. over 4 hours. When the temperature reached 110° C., 5.03 ml (18.8 millimoles) of diisobutyl phthalate was added.

The solution was stirred at the above temperature for 2 hours. After the 2 hour-reaction, the solid portion was taken by hot filtration. The solid portion was re-suspended in 275 ml of TiCl$_4$, and reacted at 110° C. for 2 hours.

After the reaction, the solid portion was taken again by hot filtration, and washed with decane at 110° C. and hexane at room temperature. This washing was continued until no titanium compound was detected in the washings.

The resulting solid titanium catalyst component [A] was obtained as a hexane slurry. A portion of the catalyst was sampled, and dried. Analysis of the dried product showed that the resulting solid titanium catalyst component [A] contained 2.5% by weight of titanium, 58% by weight of chlorine, 18% by weight of magnesium and 13.8% by weight of diisobutyl phthalate.

[Preliminary polymerization]

A 400 ml glass reactor purged with nitrogen was charged with 200 ml of purified hexane, and 6 millimoles of triethyl aluminum and 2 millimoles of the titanium catalyst component [A], calculated as titanium atom, were added. Propylene was fed into the reactor at a rate of 5.9 Nl/hr for 1 hour to polymerize 2.8 g of propylene per gram of the titanium catalyst component [A].

After the preliminary polymerization, the liquid portion was removed by filtration, and the separated solid portion was dispersed again in decane.

[Main polymerization]

A 2-liter autoclave was charged with 750 ml of purified hexane, and in an atmosphere of propylene at room temperature, 0.75 millimole of trimethylaluminum, 0.038 mole of dicyclopentyl dimethoxysilane, 0.038 millimole of propyltriethoxysilane and 0.015 millimole, calculated as titanium atom, of the titanium catalyst component [A] treated by preliminary polymerization (corresponding to 4.4 mg calculated as the catalyst component [A]) were added. Hydrogen (200 Nml) was added. The temperature was elevated to 70° C., and propylene was polymerized for 2 hours. The pressure was maintained at 7 kg/cm$^2$-G during the polymerization.

After the polymerization, the slurry containing the formed polymer was filtered to separate it into a white granular polymer and a liquid phase. After drying, the boiling n-heptane extraction residue, MFR, the apparent bulk density, polymerization activity, the II of the entire polymer, the molecular weight distribution ($\overline{Mw}/\overline{Mn}$) by GPC of the polymer, and the MFR (a), MFR (b) and log [MFR (b)/MFR (a)] when the catalyst component [C] were used singly were each measured. The results are shown in Table 1.

EXAMPLE 2

Example 1 was repeated except that in the main polymerization, vinyltriethoxysilane was used instead of propyltriethoxysilane.

The results are shown in Table 1.

The results of GPC analysis of the resulting polymer are shown in FIG. 1.

EXAMPLE 3

Example 1 was repeated except that in the main polymerization, beta-phenethylmethyldiethoxysilane was used instead of propyltriethoxysilane.

The results are shown in Table 1.

EXAMPLES 4 TO 6

Examples 1 to 3 were repeated except that in the main polymerization, di-t-butyldimethoxysilane was used instead of dicyclopentyldimethoxysilane.

The results are shown in Table 1.

Comparative Examples 1 to 2

Example 1 was repeated except that in the main polymerization, 0.075 millimole of dicyclopentyl dimethoxysilane or vinyltriethoxysilane were used instead of the two silane compounds.

The results are shown in Table 1.

The results of the GPC analysis of the resulting polymers are shown in FIG. 1.

TABLE 1

| Example | Electron donor (1) | Electron donor (2) | MFR (a) | MPR (b) | log [MFR (a)/ MFR (b)] |
|---|---|---|---|---|---|
| Example 1 | dicyclopentyl-dimethoxysilane | Propyltriethoxy-silane | 0.5 | 16 | 1.51 |
| Example 2 | dicyclopentyl-dimethoxysilane | vinyltriethoxysilane | 0.5 | 39 | 1.89 |
| Example 3 | dicyclopentyl-dimethoxysilane | β-phenethylmethyl-diethoxysilane | 0.5 | 75 | 2.18 |
| Example 4 | di-t-butyl-dimethoxysilane | Propyltriethoxy-silane | 0.16 | 16 | 1.99 |
| Example 5 | di-t-butyl-dimethoxysilane | Vinyltriethoxysilane | 0.16 | 39 | 2.39 |
| Example 6 | di-t-butyl-dimethoxysilane | β-phenethylmethyl-diethoxysilane | 0.16 | 75 | 2.67 |
| Comparative Example 1 | dicyclopentyl-dimethoxysilane | — | 0.5 | — | — |
| Comparative Example 2 | vinyltri-ethoxysilane | — | 39 | — | — |

| Example | Boiling n-hexane extraction residue (%) | MFR (g/10 min.) | Bulk density (g/cc) | Catalytic activity (g-PP/milli-mole of Ti) | t-II (%) | $\bar{M}w/\bar{M}n$ |
|---|---|---|---|---|---|---|
| Example 1 | 99.0 | 1.7 | 0.44 | 22,200 | 98.7 | 7.48 |
| Example 2 | 98.9 | 2.4 | 0.44 | 16,600 | 98.6 | 8.25 |
| Example 3 | 98.8 | 1.9 | 0.44 | 18,600 | 98.5 | 7.34 |
| Example 4 | 98.0 | 3.9 | 0.44 | 18,700 | 97.5 | 7.17 |
| Example 5 | 97.9 | 9.2 | 0.43 | 13,300 | 97.2 | 6.28 |
| Example 6 | 95.7 | 8.2 | 0.43 | 15,600 | 94.9 | 6.74 |
| Comparative Example 1 | 99.2 | 0.5 | 0.45 | 31,700 | 99.0 | 4.08 |
| Comparative Example 2 | 96.7 | 39 | 0.43 | 10,800 | 95.7 | 3.99 |

We claim:

1. A process for polymerizing an olefin which comprises polymerizing or copolymerizing an olefin in the presence of a catalyst, said catalyst being formed from (A) a solid titanium catalyst component comprising magnesium, titanium, halogen and an electron donor as essential ingredients;

(B) an organoaluminum compound catalyst component; and (C) an electron donor catalyst component comprising at least two electron donors consisting of an electron donor (1) and an electron donor (2) selected from the group consisting of organic silicon compounds of formula (I)

$$R_nSi(OR')_{4-n} \quad (I)$$

wherein R and R' each represent a hydrocarbon group and 0<n<4;

wherein an MFR(a) of a homopolypropylene obtained by homopolymerizing propylene by using the electron donor (1) in combination with the solid titanium catalyst component (A) and the organoaluminum compound catalyst component (B) and an MFR(B) of a homopolypropylene obtained by homopolymerizing propylene by using the electron donor (2) under the same conditions as in the case of using the electron donor (1) have the following relation log $(MFR(b)/MFR(a)) \geq 1.5$;

wherein the Al atom in organoaluminum compound catalyst component (B) is about 5 to 500 moles per mole of the Ti atom in the solid titanium catalyst component (A);

wherein the total amount of electron donor catalyst component (C) is about 0.001 to 2 moles, calculated as Si atoms, per mole of the Al atom in organoaluminum compound catalyst component (B); and wherein polymerization is carried out at a temperature of about 50° to 180° C. and at a pressure of about 2 to 50 kg/cm².

2. The process of claim 1 in which the solid titanium catalyst component [A] contains an ester as the electron donor; the organoaluminum compound catalyst component [B] is a trialkyl aluminum; and the olfin is an olefin having 2 to 5 carbon atoms.

3. The process of claim 2 in which the solid titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and propyltriethoxysilane; and the olefin is propylene.

4. The process of claim 2 in which the solid titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and vinyltriethoxysilane; and the olefin is propylene.

5. The process of claim 2 in which the solid titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and beta-phenethylmethyldiethoxysilane; and the olefin is propylene.

6. The process of claim 2 in which the solid titanium catalyst component [A] contains diisobutyl phthalate as the electron donor; the organoaluminum compound catalyst component [B] is triethyl aluminum; two electron donors of the electron donor catalyst component [C] are di-t-butyldimethoxysilane and propyltriethoxysilane; and the olefin is propylene.

7. The process of claim 1 in which the solid titanium catalyst component [A] is treated by preliminarily polymerizing an olefin in its presence.

8. The process of claim 7 in which the solid titanium catalyst component [A] contains an ester as the electron donor; the organoaluminum compound catalyst component [B] is a trialkyl aluminum; and the olefin is an olefin having 2 to 5 carbon atoms.

9. The process of claim 8 in which the solid titanium catalyst component [A] is treated by preliminarly polymerizing propylene in its presence.

10. The process of claim 9 in which the titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and propyltriethoxysilane; and the olefin is propylene.

11. The process of claim 9 in which the solid titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and vinyltriethoxysilane; and the olefin is propylene.

12. The process of claim 9 in which the solid titanium catalyst component [A] contains diisobutyl phthalate as the electron donor; the organoaluminum compound catalyst component [B] is triethyl aluminum; two electron donors of the electron donor catalyst component [C] are dicyclopentyldimethoxysilane and beta-phenethylmethyldiethoxysilane; and the olefin is propylene.

13. The process of claim 9 in which the solid titanium catalyst component [A] contains diisobutyl phthalate as the electron donor; the organoaluminum compound catalyst component [B] is triethyl aluminum; two electron donors of the electron donor catalyst component [C] are di-t-butyldimethoxysilane and propyltriethoxysilane; and the olefin is propylene.

* * * * *